United States Patent [19]

Gorman, Jr.

[11] Patent Number: 5,052,721
[45] Date of Patent: Oct. 1, 1991

[54] WATER METER SERVICE COUPLING

[76] Inventor: Philip P. Gorman, Jr., 1832 Malabar Dr., Germantown, Tenn. 38138

[21] Appl. No.: 471,518

[22] Filed: Jan. 29, 1990

Related U.S. Application Data

[63] Continuation-in-part of Ser. No. 331,507, Mar. 31, 1989, abandoned.

[51] Int. Cl.⁵ .............................................. F16L 35/00
[52] U.S. Cl. ........................................ 285/30; 285/31; 285/302; 285/354; 285/423; 285/413; 285/906
[58] Field of Search .................... 285/30, 31, 302, 354, 285/413, 414, 423, 906

[56] References Cited

U.S. PATENT DOCUMENTS

| | | |
|---|---|---|
| 618,194 | 1/1899 | Thomson .................... 285/302 X |
| 1,982,850 | 12/1934 | Banks .......................... 285/354 X |
| 1,997,845 | 4/1935 | Adams . |
| 2,219,218 | 10/1940 | Berger et al. .................. 285/354 X |
| 2,484,755 | 10/1949 | Smith . |
| 2,576,630 | 11/1951 | Mueller et al. . |
| 2,829,673 | 4/1958 | Reese . |
| 2,892,641 | 6/1959 | Ford . |
| 3,131,642 | 5/1964 | Geer et al. . |
| 3,136,570 | 6/1964 | Lee . |
| 3,346,274 | 10/1967 | Baron . |
| 4,094,536 | 6/1978 | Cole et al. . |
| 4,386,796 | 6/1983 | Lyall et al. . |
| 4,519,634 | 5/1985 | Hand . |
| 4,619,470 | 10/1986 | Overath et al. .................... 285/414 |
| 4,643,523 | 2/1987 | Smedley et al. . |
| 4,687,232 | 8/1987 | Zimmerman . |
| 4,715,624 | 12/1987 | Frye . |

FOREIGN PATENT DOCUMENTS 2083153 3/1982 United Kingdom .

*Primary Examiner*—Dave W. Arola
*Attorney, Agent, or Firm*—Birch, Stewart, Kolasch & Birch

[57] ABSTRACT

A water meter service coupling facilitates removal and/or replacement of a water meter by allowing for expansion of the water service line upon disconnection of the water meter. One embodiment of the water meter service coupling includes a housing having first and second ends, an expansion piston having one end thereof slidably inserted into the first end of said housing for being slidably moved into and out of said housing, a retaining insert disposed at the outer end of said expansion piston, and a nut disposed about said retaining insert for coupling said expansion piston to a water meter, wherein the second end of said housing is coupled to a water service line and the water meter service coupling is installed in an expanded state so that upon disconnection from the water meter, the water meter service coupling may be retracted so as to allow for easy removal of the water meter.

19 Claims, 2 Drawing Sheets

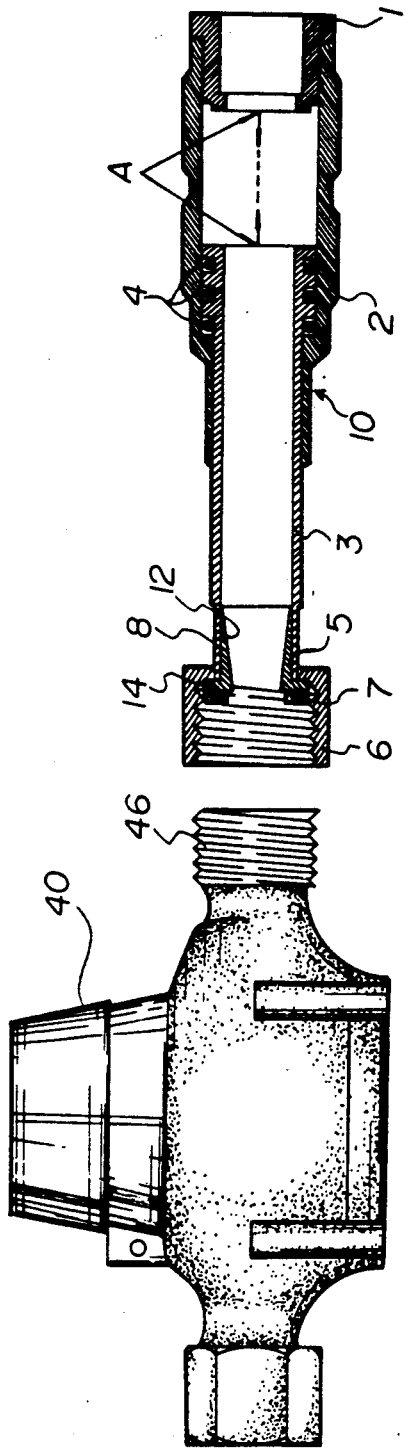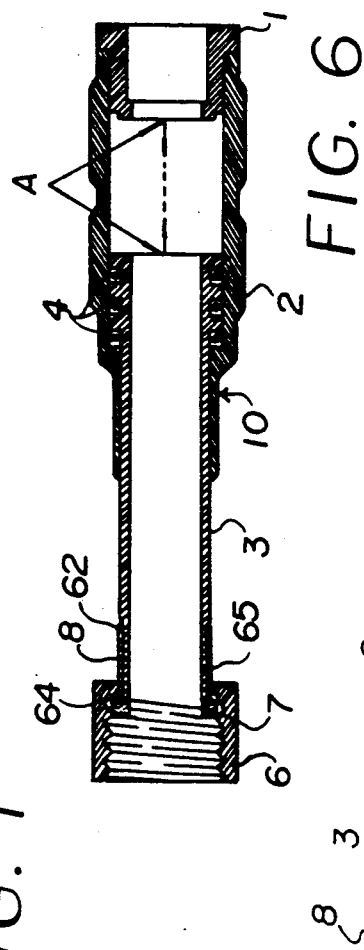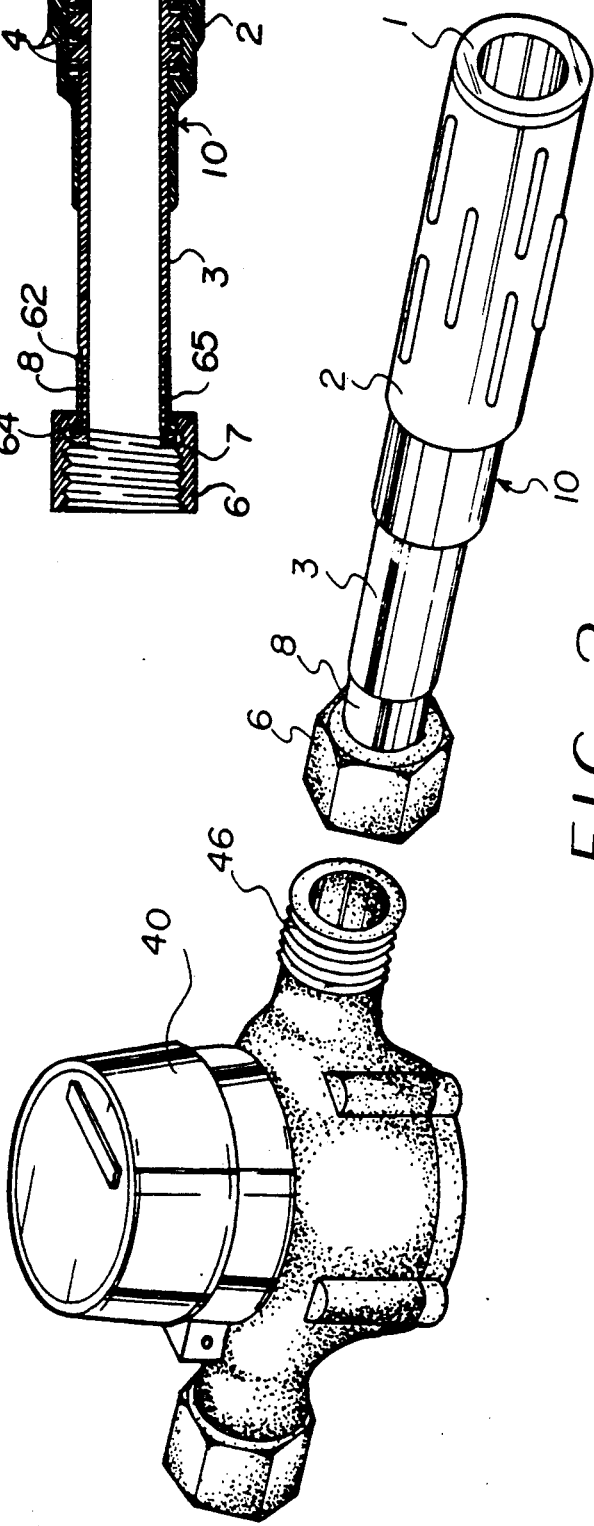
FIG. 1
FIG. 6
FIG. 2

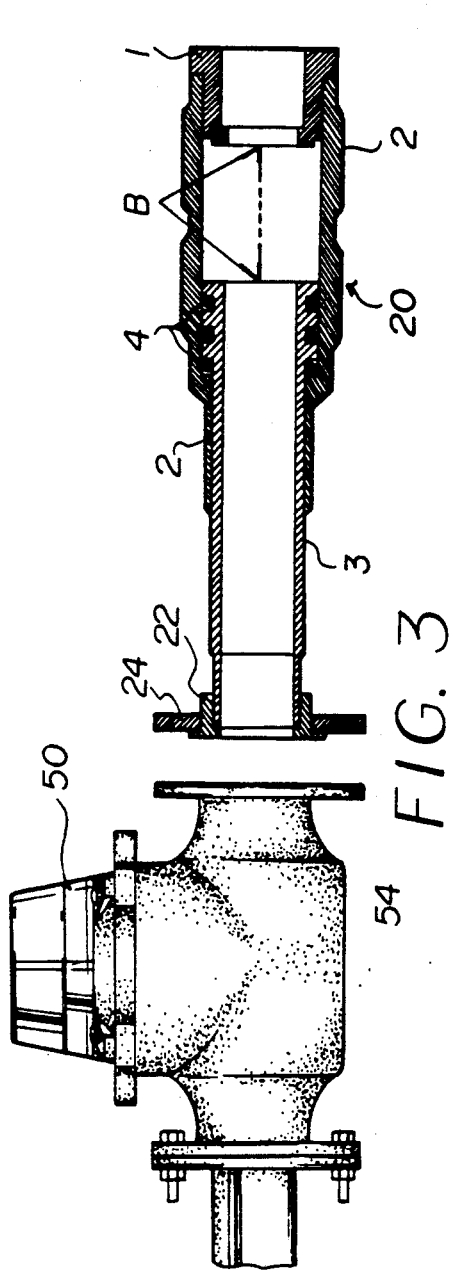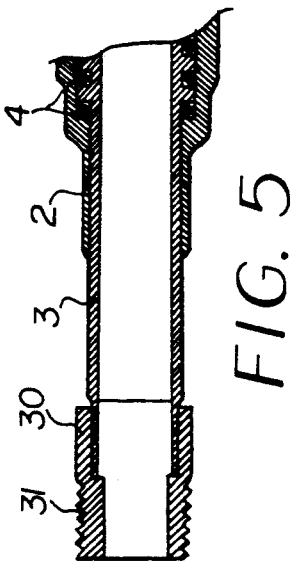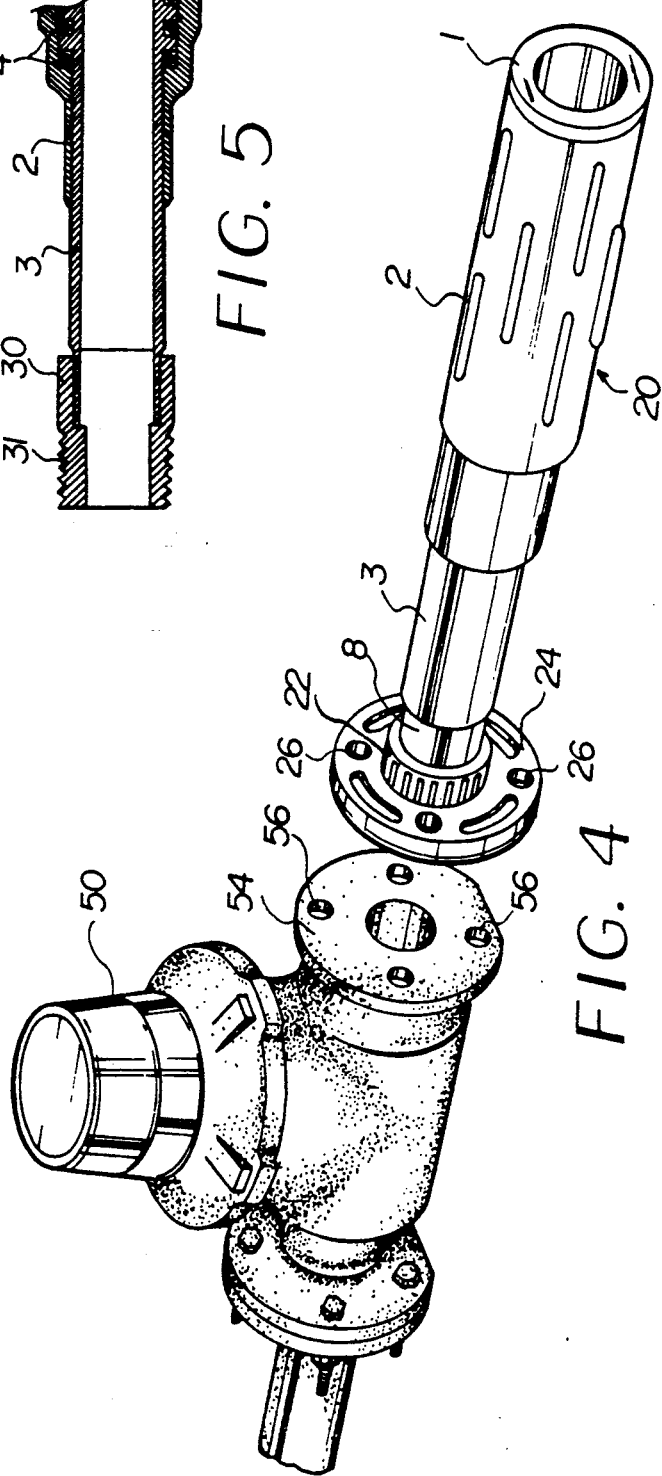

WATER METER SERVICE COUPLING

This application is a continuation-in-part of application Ser. No. 07/331,507 filed on Mar. 31, 1989, now abandoned.

BACKGROUND OF THE INVENTION

1. Field of the Invention

The present invention relates to a water meter service coupling and, more specifically, to a water meter service coupling which connects a water service line to a water meter and which has an expandable piston slidably disposed within a housing so as to facilitate removal and/or replacement of the water meter by allowing for expansion of the water service line upon disconnection of the water meter.

2. Description of Related Art

There are several methods for installing water meters. One conventional method for installing a meter is to place the meter below ground where it is protected by a meter box. This method allows for access to the meter for reading and properly charging a water customer the correct amount of money for the amount of water used over a given period of time. The meter is connected to a water main by means of water service lines. The service lines vary in materials from copper tubing, polyethylene tubing, galvanized steel, to polyvinyl chloride. The lengths of the service lines from the main to the meter and from the meter to the home may also vary.

Inside the meter box is a "cut off" valve which is connected to the service line. This valve is connected to the water meter by the first of two "union joint" nipples used in the meter box. The first nipple is screwed into the valve and the "union joint" is then conventionally connected to the inlet side of the water meter. A second "union joint" nipple is usually employed on the outlet side of the water meter leading to the house. The second "union joint" nipple generally serves two purposes. First, it allows the utility company to remove the water meter for repair or replacement. Second, it allows the plumber to connect to the meter for the purposes of running the water line from the meter to the house. Examples of conventional water meter nipples are disclosed in U.S. Pat. No. 2,576,630 to Mueller et al and U.S. Pat. No. 1,997,845 to Adams.

This conventional construction suffers from several problems however. The service line from the water main to the meter and from the meter to the home almost always expands over time before an attempt is made to remove the water meter. Expansion tension is caused by the service line being laid in the service ditch in a manner contrary to being installed in a flat or straight position in the bottom of the ditch. Next, all pipe fittings are connected from the water main to the house, including the water meter. The ditch is then filled with dirt or other suitable material. The weight of the dirt causes the service line to lay flat in the bottom of the ditch. The service line, being forced to lay flat because of the weight of the dirt, extends to cover a longer distance than when being left uncovered by dirt. This attempt, to extend to cover a longer distance, is a cause of the service line extension or expansion when the water meter is removed for replacement or repair. Expansion and contraction of the same service line is also caused by seasonal temperature variations. This in turn causes a ground temperature change that is then transmitted to the service lines causing the expansion or contraction. This makes it very difficult to remove or install a replacement water meter.

Accordingly, a need in the art exists for a simple and economical means for coupling a water meter to a service line which allows for expansion of the service line so as to provide for easier removal and/or replacement of the water meter.

SUMMARY OF THE INVENTION

Accordingly, it is an object of the present invention to provide a water meter service coupling which allows for expansion of water service lines when the water meter is being removed and/or replaced.

It is a further object of the present invention to provide a water meter service coupling which has retracting capabilities so as to facilitate the removal and/or replacement of a water meter after disconnection of the water meter from service lines.

It is still another object of the present invention to provide a water meter service coupling which is simple in construction and economical to manufacture and may be easily employed with commonly used standard water meters.

It is yet another object of the present invention to provide a water meter service coupling which is durable and remains rust free and is easily connected to both the water service line and the water meter.

It is still a further object of the present invention to provide a water meter service coupling which protects against water pressure leakage and contamination from outside sources, as well as ensures a leakproof connection between the water service line and the water meter.

These and other objects of the present invention are fulfilled by providing a water meter service coupling which includes a first embodiment a housing having first and second ends, an expansion piston having one end thereof slidably inserted into the first end of the housing for being slidably moved into and out of said housing, a retaining insert disposed at the outer end of the expansion piston, and a nut disposed about the retaining insert for coupling the expansion piston to a water meter, wherein the second end of the housing is coupled to a water service line and the water meter service coupling is installed in an expanded state so that upon disconnection from the water meter, the water meter service coupling may be retracted so as to allow for easy removal of the water meter. In a second embodiment a flange member may be disposed at the outer end of the expansion piston for being connected to a corresponding flange portion of a water meter. In a third embodiment, a male adapter member having a male threaded portion may be disposed at the outer end of the expansion piston for being connected to a corresponding female threaded portion of a water meter.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the accompanying drawings which are given by way of illustration only, and thus are not limitative of the present invention, and in which like elements are given like reference numbers, wherein:

FIG. 1 is a diagrammatic view and FIG. 2 is a perspective view of a first embodiment of the water meter service coupling of the present invention;

FIG. 3 is a diagrammatic view and FIG. 4 a perspective view of a second embodiment of the water meter service coupling of the present invention;

FIG. 5 is a diagrammatic view of a third embodiment of the water meter service coupling of the present invention; and FIG. 6 is a diagrammatic view of a preferred version of the first embodiment of the water meter service coupling of the present invention.

DETAILED DESCRIPTION OF THE INVENTION

A first embodiment of the water meter service coupling of the present invention is illustrated in FIGS. 1 and 2. A water meter service coupling 10 includes a housing 2 with a socket coupling insert 1 disposed in one end thereof for retaining expansion piston 3 in the water meter service coupling and also for being coupled to a water service line. The housing and socket coupling insert may be made of plastic, and are preferably made of polyvinyl chloride (PVC), and more preferably PVC type 1, Grade 1 so as to meet the requirements of ASTM D1784. Sldably inserted into the housing 2 is an expansion piston 3. The expansion piston 3 may preferably include two or three O-rings 4 so as to provide for an effective seal and so as to protect against water pressure leakage and contamination from outside sources. The expansion piston 3 may include a spigot 8 at the outer end thereof. The expansion piston 3 may be made from plastic, and is preferably made from PVC type 1, Grade 1 so as to meet ASTM requirements. The O-rings 4 may be formed from rubber, and are preferably made of high grade rubber, so as to provide for an effective seal between the expansion piston 3 and the interior of the housing 2. The O-rings may preferably be formed from high grade Buna "N" or any elastomeric compound that is generally resistant to many hydrocarbons, fats, oils, greases, hydraulic fluids and various chemicals.

In a first embodiment, a retaining insert 5 is disposed at the outer end of the expansion piston 3 so as to facilitate coupling between the expansion piston and the water meter. In the embodiment illustrated in FIGS. 1 and 2, the retaining insert 5 includes a cylindrical body portion 12 which fits within the spigot 8 of the expansion piston 3. A retaining flange 14 extends outside the spigot 8 so as to retain a nut 6 for being coupled to the nipple of a water meter.

In a preferred version of the first embodiment of the present invention, as illustrated in FIG. 6, a retaining insert 65 is disposed peripherally about the exterior of the outer end of the expansion piston 3 so as to facilitate coupling between the expansion piston and the water meter. In this preferred embodiment illustrated in FIG. 6, the retaining insert 65 includes a cylindrical body portion 62 which fits peripherally about the exterior portion of the spigot 8 of the expansion piston 3. A retaining flange 64 extends peripherally outside the spigot 8 so as to retain the nut 6 for being coupled to the nipple of a water meter. The retaining insert 65 is designed to fit peripherally about the exterior of the spigot which advantageously allows for full flow capacity and low flow turbulence without requiring a reduction in the wall thickness and without sacrificing any structural strength.

The retaining inserts 5 and 65 may be made of plastic, and are preferably made of PVC so as to meet ASTM requirements. The retaining inserts 5 and 65 may be solvent welded to the expansion piston 3. The nut 6 is preferably formed from brass so as to reduce the possibility of "cross threading" when being connected to the water meter and is preferably made from American Water Works Association (AWWA) Standard Material. The PVC construction of the housing 2, expansion piston 3 and retaining inserts 5 or 65, advantageously allows the water meter service coupling to remain rust free and assures efficient expansion and retraction during use. A rubber washer 7 may also be inserted between the nut 6 and the water meter to ensure a leakproof connection. The rubber washer may be formed from high grade rubber, preferably neoprene.

The water meter service coupling of the present invention may be constructed in varying dimensions for different size water meters as required, such as for example in dimensions which accommodate water meter sizes ⅝", ⅝"×¾", 1" and 1 ¼". For example, a ¾" size water meter service coupling may be constructed so as to expand or retract a distance A of about 2 ¼" as illustrated for example in FIG. 1.

During operation, the water meter service coupling is installed by connecting the nut 6 to the outlet side of the water meter. The water meter service coupling is installed in an expanded position. The home water service line is then connected by attaching the proper adapter to the housing 3. For example, the home service line may be connected by solvent cementing PVC pipe directly into coupling insert 1. Alternatively, a PVC spigot by compression adapter may be solvent cemented into coupling insert 1 to facilitate connection between the service coupling and a service line formed from pipe, such as standard steel pipe or formed from tubing, such as copper tubing, wherein the pipe cannot be solvent cemented because of the lack of compatibility between PVC and steel or tubing having a diameter less than that of the coupling insert and also lacking compatibility.

The removal of a water meter would then be made easier because of the retracting capabilities of the water meter service coupling, since the service coupling may easily be retracted after disconnection from the water meter. Further, the installation of a new water meter would then be made easier because of the expansion capabilities of the water meter service coupling. The nut 6 may also be reconnected to the water meter.

A second embodiment of the water meter service coupling of the present invention is illustrated in FIGS. 3 and 4. A water meter service coupling 20 includes a flange support member 22 affixed, for example by solvent cementing, to the exterior of the outer end of the expansion piston 3, and a flange coupling member 24 disposed peripherally about the support member 22. The flange coupling member 26 corresponds to and is coupled with a water meter flange portion 54 which may be disposed at the outlet end of a water meter 50 as illustrated in FIGS. 3 and 4. The flange coupling member 24 may include bolt holes 26 which correspond to bolt holes 56 in the flange portion 54. The flange support member 22 and flange coupling member 24 may be formed from plastic and are preferably formed from PVC so as to meet ASTM requirements. The additional elements in the second embodiment may be formed from materials similar to those mentioned above with regard to like elements in the first embodiment. The water meter service coupling may be constructed in varying dimensions, such as for example in dimensions which accommodate water meter sizes 1 ¼", 2", 3", 4" and larger. For example, a 2" size water meter service coupling may be constructed so as to expand or retract a distance B of about 3" as illustrated in FIG. 3, for example.

In a third embodiment of the water meter service coupling of the present invention a male adapter member 30 having a male threaded portion 31 is attached to the exterior portion of the outer end of the expansion piston 3. The male adapter member 30 may be solvent cemented on to the piston 3 and may be formed from plastic. The member 30 is preferably formed from PVC so as to meet ASTM requirements and so as to accommodate water meters having female threaded portions. This embodiment may be formed in varying dimensions, such as for example in dimensions which accommodate 1 ¼", 1 ½", and 2" water meter sizes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water meter coupling which comprises:
   a housing having first and second ends, .
   an expansion piston having a first end thereof slidably inserted into said first end of said housing for being slidably moved into and out of said housing, wherein said housing and said expansion piston are formed from plastic,
   a connecting means disposed at the outer second end of said expansion piston for connecting said water meter thereto comprising a retaining insert disposed at the outer second end of said expansion piston, and a nut disposed about said retaining insert for coupling said expansion piston to said water meter,
   wherein said second end of said housing is coupled to a water service line, and said water meter service coupling is installed in an expanded state so that upon disconnection from said water meter, said water meter service coupling may be retracted so as to allow for easy removal of said water meter.

2. The water meter service coupling of claim 1, wherein said housing, said expansion piston, and said retaining insert are formed from polyvinyl chloride.

3. A water meter coupling which comprises:
   a housing having first and second ends;
   an expansion piston having a first end thereof slidably inserted into said fist end of said housing for being slidably moved into and out of said housing wherein said housing and said expansion piston are formed from plastic,
   a connecting means disposed at the outer second end of said expansion piston for connecting said water meter thereto.
   wherein said second end of said housing is coupled to a water service line, and said water meter service coupling is installed in an expanded state so that upon disconnection from said water meter, said water meter service coupling may be retracted so as to allow for easy removal of said water meter,
   wherein said connecting means comprises a flange member disposed at the outer second end of said expansion piston for being connected to a water meter.

4. The water meter service coupling of claim 3, wherein said flange member comprises a flange support member affixed peripherally about the exterior of the end of said expansion piston and a flange coupling member disposed peripherally about the exterior of said flange support member for coupling to a flange portion of a water meter.

5. The water meter service coupling of claim 4, further comprising:
   a socket coupling insert disposed in said first end of said housing for retaining an expansion piston in said water meter service coupling and also for coupling with a water line, and
   a sealing means disposed about said first end of said expansion piston for maintaining a seal within said housing.

6. The water meter service coupling of claim 5, wherein said housing, said socket coupling insert and said expansion piston are formed from polyvinyl chloride, and wherein said O-rings are formed from high grade rubber.

7. A water meter coupling which comprises:
   a housing having first and second ends,
   an expansion piston having a first end thereof slidably inserted into said first end of said housing for being slidably moved into and out of said housing, wherein said housing and said expansion piston are formed from plastic,
   a connecting means disposed at the outer second end of said expansion piston for connecting said water thereto,
   wherein said second end of said housing is coupled to a water service line, and said water meter service coupling is installed in an expanded state so that upon disconnection from said water meter, said water meter service coupling may be retracted so as to allow easy removal of said water meter,
   wherein said connecting means comprises a sale adapter member having a male threaded portion, said adapter member being disposed at the outer second end of said expansion piston for being connected to a water meter.

8. The water meter service coupling of claim 7, further comprising:
   a socket coupling insert disposed in said first end of said housing for retaining an expansion piston in said water meter service coupling and also for coupling with a water line, and
   a sealing means disposed about said first end of said expansion piston for maintaining a seal within said housing.

9. The water meter service coupling of claim 8, wherein said housing, said socket coupling insert and said expansion piston are formed from polyvinyl chloride, and wherein said O-rings are formed from high grade rubber.

10. The water meter service coupling of claim 7, wherein said male adapter comprises a cylindrical body portion and a cylindrical threaded portion having threads on the exterior thereof.

11. The water meter service coupling of claim 10, wherein said cylindrical body portion of said adapter is disposed about the exterior of the outer end of said expansion piston and said cylindrical threaded portion extends from the outer end of said expansion piston.

12. The water meter service coupling of claim 1, wherein said retaining insert comprises a cylindrical body portion and a retaining flange along the outer periphery of one end of said cylindrical body portion.

13. The water meter service coupling of claim 12, wherein said cylindrical body portion of said retaining insert is disposed within the interior of the outer second end of said expansion piston and said retaining flange extends peripherally out of the outer end of said expansion piston.

14. The water meter service coupling which comprises:
   a housing having first and second ends;
   a socket coupling insert disposed in said first end of said housing for retaining an expansion piston in said water meter service coupling and also for coupling with a water line;
   an expansion piston having first and second ends, said first end of said expansion piston being slidably inserted into said second end of said housing for being slidably moved into and out of said housing, said expansion piston having sealing means disposed about said first end for maintaining a seal within said housing;
   a retaining insert having first and second ends, said first end of said retaining insert being disposed at said second end of said expansion piston, wherein said retaining insert facilitates coupling of said expansion piston to a water meter; and
   a nut for coupling to a water meter, said nut being disposed about said retaining insert so as to be retained thereby and so that said nut may be screwed on to a nipple of a water meter, wherein said second end of said housing is coupled to a water service line, and said water meter service coupling is installed in an expanded state so that upon disconnection from said water meter said water meter service coupling may be retracted so as to allow for easy removal of said water meter, and wherein said housing, said expansion and said retaining insert are formed from plastic.

15. The water meter service coupling of claim 13, wherein said sealing means comprises two or three 0-rings disposed about said expansion piston.

16. The water meter service coupling of claim 15, wherein said housing, said socket coupling insert, said expansion piston, and said retaining insert are formed from polyvinyl chloride, wherein said nut is formed from brass, and wherein said O-rings are formed from high grade rubber.

17. The water meter service coupling of claim 13, wherein said retaining insert comprises a hollow cylindrical body and a retaining flange which extends peripherally from one end thereof, said body of said retaining insert being secured within the interior of said expansion piston so that said retaining flange peripherally extends to retain said nut.

18. The water meter service coupling of claim 14, wherein said retaining insert comprises a cylindrical body portion and a retaining flange along the outer periphery of one end of said cylindrical body portion.

19. The water meter service coupling of claim 14, wherein said retaining insert comprises a hollow cylindrical body and a retaining flange which extends peripherally from one end thereof, said body of said retaining insert being secured peripherally about the exterior of the outer second end of said expansion piston so that said retaining flange peripherally extends to retain said nut.

* * * * *